(No Model.)

H. H. SPECK.
CHILD'S CARRIAGE.

No. 417,109. Patented Dec. 10, 1889.

Witnesses
Geo. W. Young.
Wm. Klug

Inventor
Herman H. Speck
By Stout & Underwood
Attorneys

UNITED STATES PATENT OFFICE.

HERMAN H. SPECK, OF MILWAUKEE, WISCONSIN.

CHILD'S CARRIAGE.

SPECIFICATION forming part of Letters Patent No. 417,109, dated December 10, 1889.

Application filed September 23, 1889. Serial No. 324,766. (No model.)

*To all whom it may concern:*

Be it known that I, HERMAN H. SPECK, of Milwaukee, in the county of Milwaukee, and in the State of Wisconsin, have invented certain new and useful Improvements in Children's Carriages; and I do hereby declare that the following is a full, clear, and exact description thereof.

My invention relates to children's carriages; and it consists in certain peculiarities of construction and combination of parts, to be hereinafter described with reference to the accompanying drawings and subsequently claimed.

Figure 1:
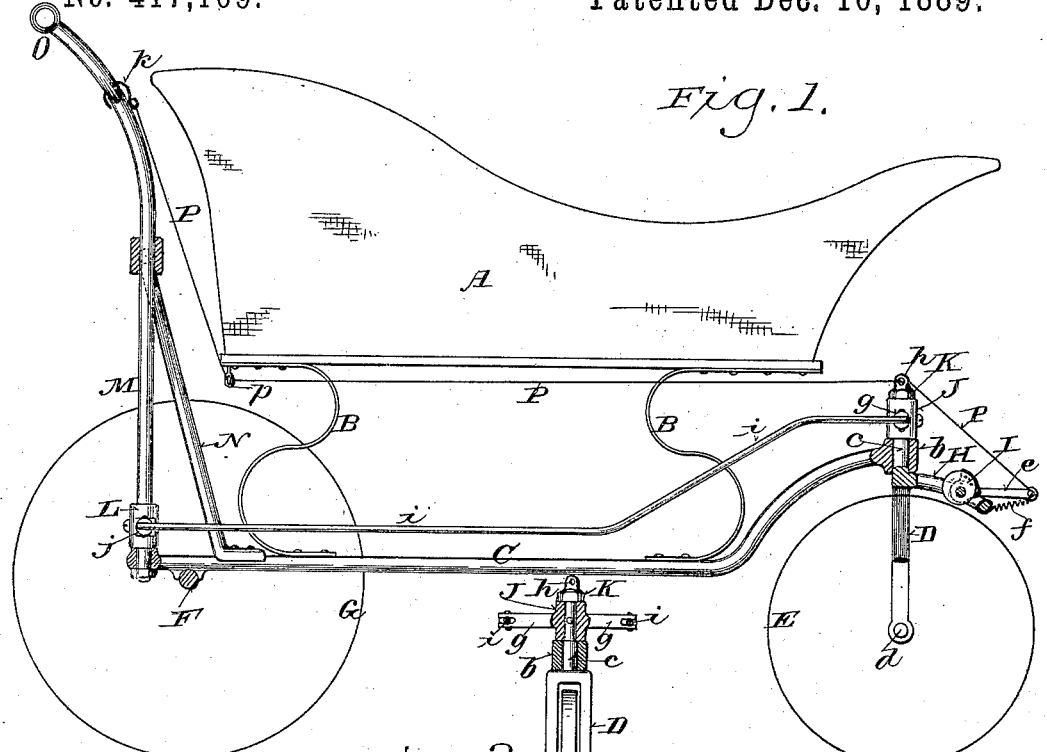
Figure 2:
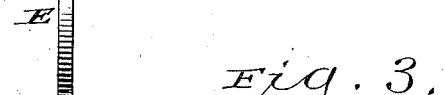
Figure 3:
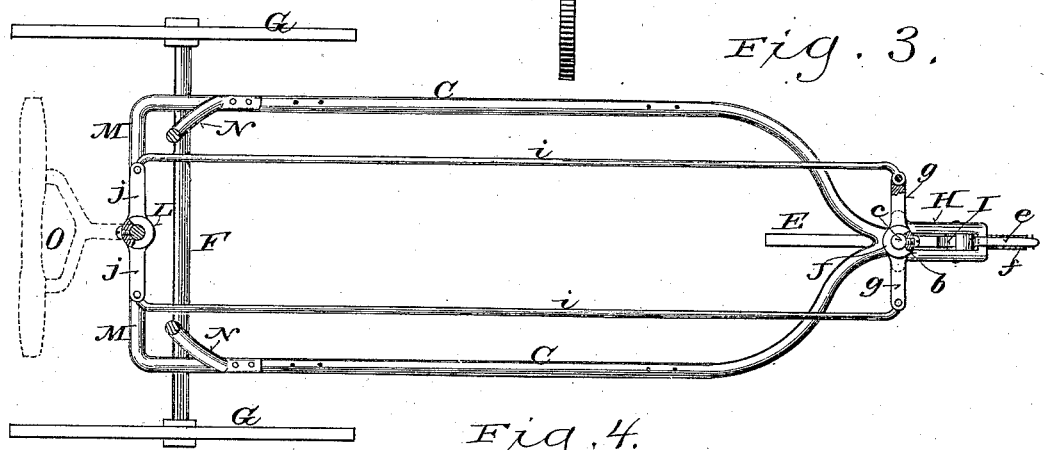
Figure 4:
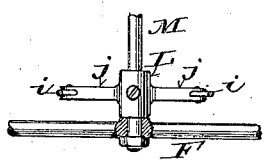

In the drawings, Figure 1 represents a side elevation of my device, partly in section; Fig. 2, a front elevation of the steering mechanism; Fig. 3, a plan view of the running-gear and steering mechanism, and Fig. 4 a rear elevation of said steering mechanism.

Referring by letter to the drawings, A represents the carriage-body supported on springs B, connected to a frame C, the latter having a goose-necked front end terminated in a central bearing $b$ for the shank $c$ of a fork D. The fork D is provided with bearings for the axle $d$ of a wheel E, and the rear end of the frame C is supported on an axle F for the rear wheels G of the vehicle. A loop H extends forward from the fork D over the wheel E and is provided with bearings for a cam-brake I, the latter having an arm $e$, connected to said loop by means of a spiral spring $f$, as shown in Fig. 1.

Rigidly connected to the shank $c$ of the fork D is a sleeve J, provided with lateral arms $g$, and a nut K, engaging the screw-threaded end of said shank, is provided with an eye $h$, for the purpose to be hereinafter described. The lateral arms $g$ of the sleeve J are united by longitudinal rods $i$, with similar arms $j$, belonging to a sleeve L, fast on a vertical rod M, that has its bearings in the rear end of the frame C and in a bracket N, that extends up from the sides of said frame, this rod being bifurcated at its upper end and the bifurcations thereof connected to a handle O.

The carriage is propelled by pushing on the handle O and the latter being actuated to turn the rod M in its bearings. The front wheel E is changed as to direction to steer said carriage.

Connected to the arm $e$ of the brake I is a cord P, that passes through the eye $h$ on the nut K and back through another eye P, depending from the bottom at the rear of the carriage-body A, this cord being provided at its rear end with a hook $k$, that normally engages one of the bifurcations at the upper end of the rod M; but when it is desirable to set said brake said cord is pulled back and its hook may be engaged with the handle O. The brake is set against the resistance of the spring $f$, and the contraction of the latter returns said brake to its normal position when the cord P is slackened.

By the construction above described it will be seen that the propulsion, steering, and braking of the carriage is effected from the rear thereof.

Having thus described my invention, what I claim as new, and desire to secure by Letters Patent, is—

1. The combination, with the wheel E and the fork D, provided with the loop H, of the cam-brake I, having its bearings in said loop, substantially as set forth.

2. The combination, with the wheel E, of the cam-brake I and the cord P, for setting said brake, substantially as set forth.

3. The combination, with the wheel E, of the spring-controlled cam-brake I and the cord P, for setting said brake, substantially as set forth.

4. The combination of the frame C, provided with the bearing $b$, the fork D, having the shank $c$, arranged in said bearing, the wheel E, journaled to said fork, the sleeve J, fast on said shank and provided with the lateral arms $g$, the pivotal pushing-rod M, provided with the rigid sleeve L, having lateral arms $j$, and the longitudinal rods $i$, uniting said arms $g\,j$, substantially as set forth.

In testimony that I claim the foregoing I have hereunto set my hand, at Milwaukee, in the county of Milwaukee and State of Wisconsin, in the presence of two witnesses.

HERMAN H. SPECK.

Witnesses:
H. G. UNDERWOOD,
WM. KLUG.